(12) United States Patent
Kuroki

(10) Patent No.: US 11,800,234 B2
(45) Date of Patent: Oct. 24, 2023

(54) IMAGE CAPTURING APPARATUS, CONTROL METHOD, AND STORAGE MEDIUM

(71) Applicant: CANON KABUSHIKI KAISHA, Tokyo (JP)

(72) Inventor: Daisuke Kuroki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/542,234

(22) Filed: Dec. 3, 2021

(65) Prior Publication Data

US 2022/0191377 A1   Jun. 16, 2022

(30) Foreign Application Priority Data

Dec. 14, 2020   (JP) ................................ 2020-206642

(51) Int. Cl.
*H04N 23/73*   (2023.01)
*H04N 23/71*   (2023.01)

(52) U.S. Cl.
CPC ............. *H04N 23/73* (2023.01); *H04N 23/71* (2023.01)

(58) Field of Classification Search
CPC ............... H04N 5/2353; H04N 5/2351; H04N 5/23296; H04N 5/145; H04N 5/23299; H04N 23/73; H04N 23/71; H04N 23/695; H04N 23/69
See application file for complete search history.

(56) References Cited

U.S. PATENT DOCUMENTS

| 2005/0253956 | A1* | 11/2005 | Ono | H04N 5/2351 348/E5.035 |
|---|---|---|---|---|
| 2012/0281133 | A1* | 11/2012 | Kurita | H04N 5/2353 348/E5.037 |
| 2012/0301125 | A1* | 11/2012 | Ashida | H04N 5/23219 396/95 |
| 2012/0312960 | A1 | 12/2012 | Mine | |
| 2014/0362173 | A1* | 12/2014 | Doepke | H04N 5/23238 348/36 |
| 2018/0063436 | A1* | 3/2018 | Miyazawa | H04N 5/2328 |
| 2018/0241927 | A1 | 8/2018 | Chen | |

FOREIGN PATENT DOCUMENTS

| JP | 2011004089 A | 1/2011 |
|---|---|---|
| WO | 2013/121073 A1 | 8/2013 |

* cited by examiner

*Primary Examiner* — Jason A Flohre
(74) *Attorney, Agent, or Firm* — CANON U.S.A., INC. IP Division

(57) ABSTRACT

An image capturing apparatus includes an image capturing unit configured to set an exposure condition for each of regions on an image capturing plane and capture an image, an acquisition unit configured to acquire luminance information about each of the regions in the image captured by the image capturing unit, a calculation unit configured to calculate change information about an image to be acquired in next image capturing, and a determination unit configured to determine an exposure condition for the image capturing unit in the next image capturing for each of the regions based on the change information calculated by the calculation unit and the luminance information about each of the regions acquired by the acquisition unit.

12 Claims, 11 Drawing Sheets

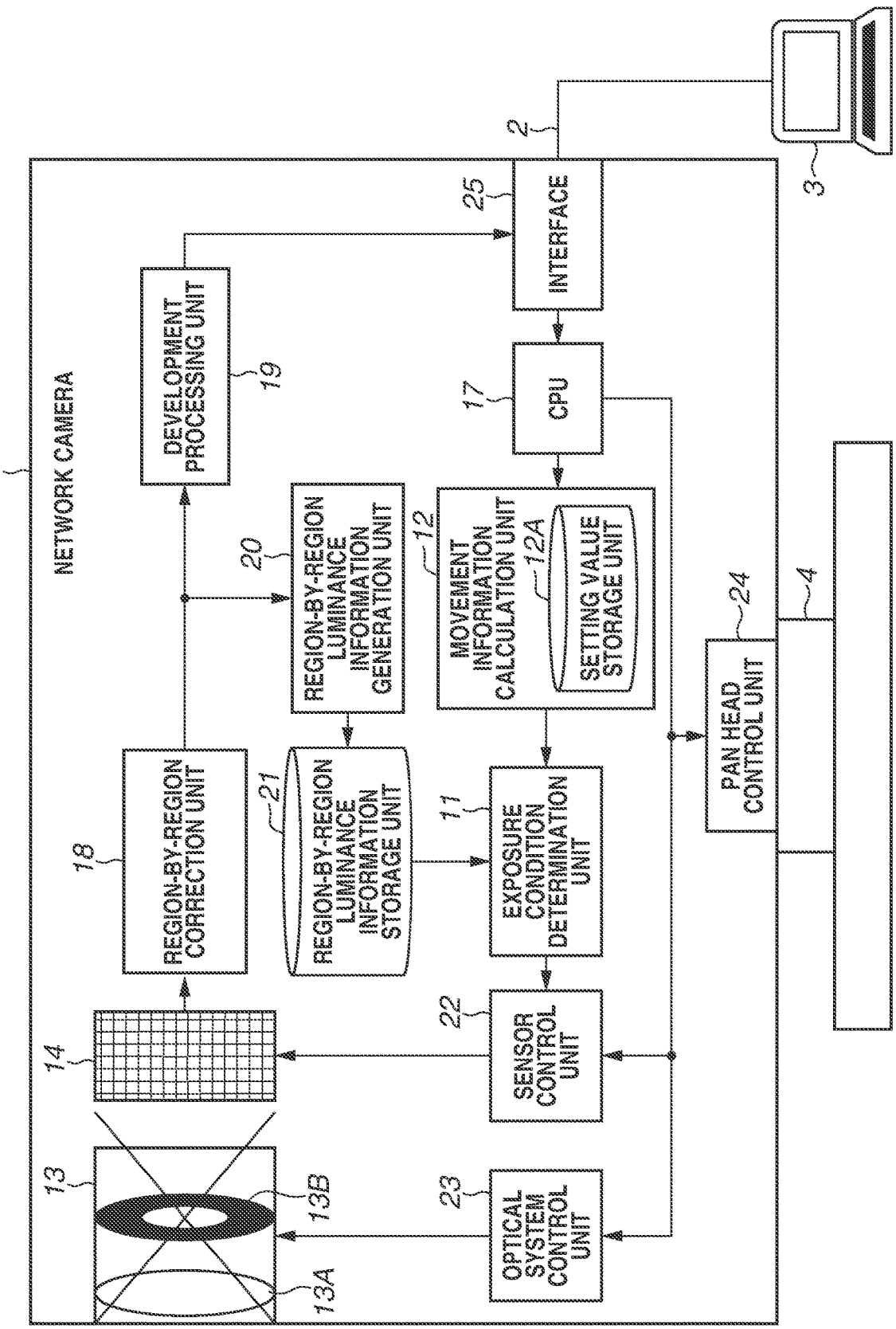

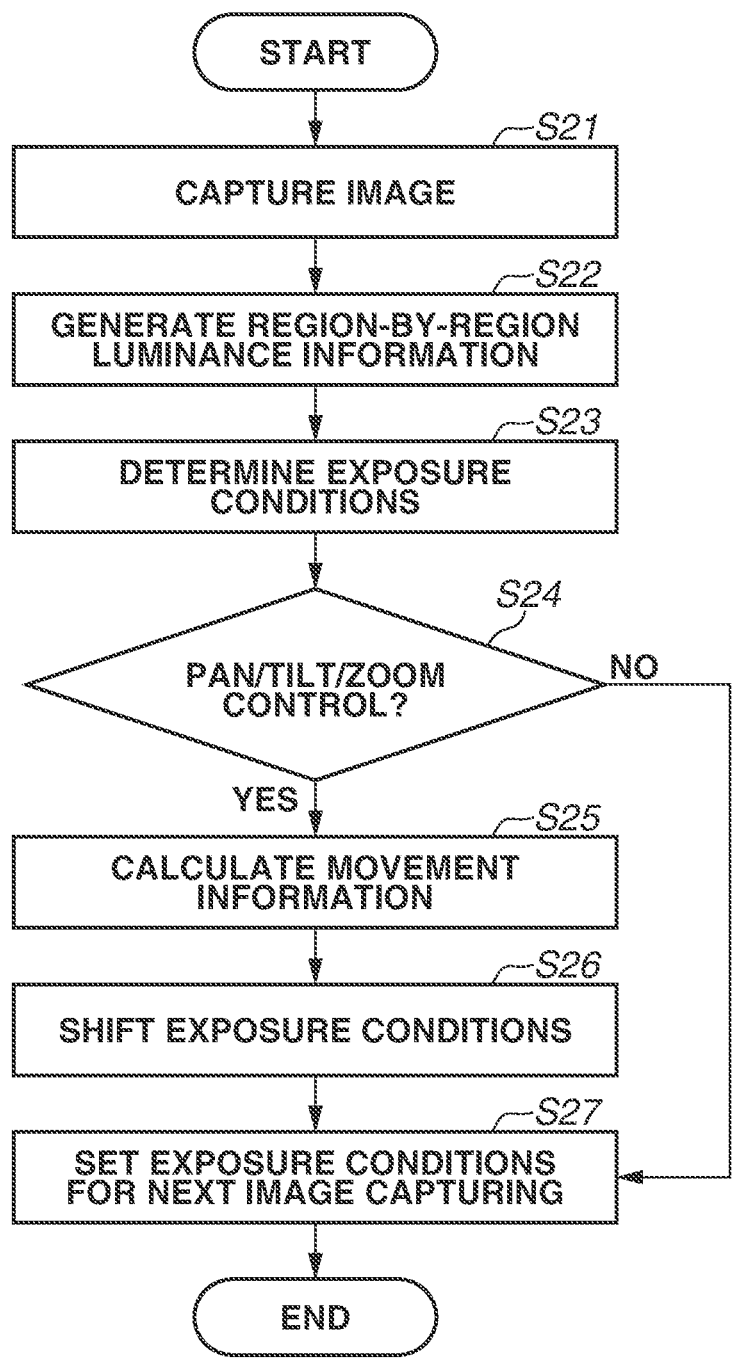

IMAGE CAPTURING APPARATUS, CONTROL METHOD, AND STORAGE MEDIUM

BACKGROUND OF THE DISCLOSURE

Field of the Disclosure

The present disclosure relates to an image capturing apparatus, a control method, and a storage medium.

Description of the Related Art

Image sensors, such as a charge coupled device (CCD) sensor and a complementary metal oxide semiconductor (CMOS) sensor, included in image capturing apparatuses, such as a digital camera and a digital video camera, are generally known to have a dynamic range narrower than the dynamic range in the natural world. Consequently, in a case of capturing an image of a scene having a wide dynamic range (a high dynamic range) by using a normal method, underexposure, overexposure, and the like undesirably occur.

According to the technique discussed in Japanese Patent Application Laid-Open Publication No. 2011-4089, in determination of optimum exposure conditions for each regions on an image sensor capable of controlling exposure conditions for each of the regions based on preliminary image capturing, an exposure condition in a region at a boundary between the exposure conditions is adjusted to be set darker by selection from among exposure conditions of regions surrounding the boundary, and image capturing is performed. This technique reduces occurrence of overexposure due to movement of a subject in a time lag between preliminary image capturing and main image capturing.

SUMMARY OF DISCLOSURE

According to an aspect of the present disclosure, an image capturing apparatus includes an image capturing unit configured to set an exposure condition for each of regions on an image capturing plane and capture an image, an acquisition unit configured to acquire luminance information about each of the regions in the image captured by the image capturing unit, a calculation unit configured to calculate change information about an image to be acquired in next image capturing, and a determination unit configured to determine an exposure condition for the image capturing unit in the next image capturing for each of the regions based on the change information calculated by the calculation unit and the luminance information about each of the regions acquired by the acquisition unit.

Further features of the present disclosure will become apparent from the following description of embodiments with reference to the attached drawings.

BRIEF DESCRIPTION OF THE DRAWINGS

FIG. 1 is a block diagram illustrating an example of the configuration of an image capturing system according to a first embodiment.

FIG. 8 is a diagram illustrating an example of a table for use in determination of exposure conditions.

FIG. 11 is a flowchart illustrating an example of processing for determining exposure conditions based on shifting performed on exposure conditions.

DESCRIPTION OF THE EMBODIMENTS

Figure 2A:
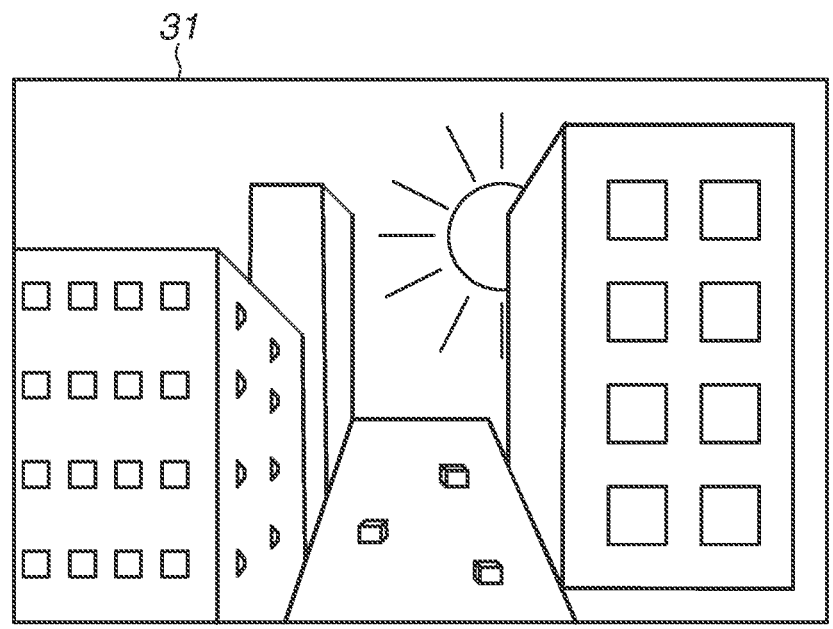
FIG. 2A is a diagram illustrating an example of a captured image.

In the following description, embodiments for implementing the present disclosure will be described in detail with reference to the attached drawings. The embodiments that will be described below are merely an example as how the present disclosure can be embodied and shall be modified or changed as appropriate according to the configuration of an apparatus to which the present disclosure is applied and various kinds of conditions, and the present disclosure is not necessarily limited to the following embodiments. Not all of combinations of features that will be described in the embodiments are necessarily essential to the solution of the present disclosure.

Configuration of Image Capturing System

FIG. 1 is a block diagram illustrating an example of a configuration of an image capturing system according to a first embodiment.

This image capturing system includes a network camera 1 for capturing an image of a subject, a terminal apparatus 3, such as a personal computer, connected to the network camera 1 via a network 2, and a pan head 4 for changing an image capturing direction of the network camera 1 in pan and tilt directions. In the following description, the present embodiment will be described based on an example case of moving image capturing, but the present disclosure can also be applied to a case where main image capturing is performed after preliminary image capturing of a still image is performed.

The network camera 1 is configured to transmit a video image captured with a high dynamic range by streaming distribution via the network 2. The network camera 1 has a pan, tilt, and zoom function of controlling the image capturing direction in the pan and tilt directions by controlling the pan head 4, and controlling zooming by controlling an optical system.

The network camera 1 includes an exposure condition determination unit 11 for determining exposure conditions, a movement information calculation unit 12 for calculating movement information, such as a movement amount and a direction between captured images, an optical system 13 for forming an image of a subject, and an image sensor 14 for converting the formed image of the subject into an electric signal.

The optical system 13 includes a shutter, a lens 13A, a diaphragm 13B, an optical low-pass filter, and the like, and has the zoom function.

The image sensor 14 includes a color filter and an image sensor, such as a complementary metal oxide semiconductor (CMOS), and can perform image capturing in which an image capturing plane of the image sensor 14 is divided into a plurality of regions and the exposure conditions, such as an accumulation time and a readout gain, are set for each of the regions.

The network camera 1 includes a central processing unit (CPU) 17 for controlling the entire apparatus, a region-by-region correction unit 18 for performing correction processing for each predetermined region in an image captured by the image sensor 14, and a development processing unit 19 for performing development processing on the image subjected to the correction processing performed by the region-by-region correction unit 18.

The network camera 1 further includes a region-by-region luminance information generation unit 20 for generating luminance information based on luminance of each predetermined region in a captured image, and a region-by-region luminance information storage unit 21 for storing the luminance information generated by the region-by-region luminance information generation unit 20.

The network camera 1 includes a sensor control unit 22 for controlling the image sensor 14, an optical system control unit 23 for controlling the optical system 13, a pan head control unit 24 for controlling the pan head 4, and an interface 25 for communicating with the terminal apparatus 3 via the network 2.

Overall Operation

In response to a user operating the terminal apparatus 3 and an instruction issued by the user to make image capturing settings including panning, tilting, and zooming of the network camera 1, the terminal apparatus 3 transmits the instruction issued by the user to the network camera 1 via the network 2.

In a case where the interface 25 receives the instruction issued by the user via the network 2, the CPU 17 drives the pan head 4, the optical system 13, and the image sensor 14 by controlling settings and timings of the pan head control unit 24, the optical system control unit 23, and the sensor control unit 22.

The region-by-region correction unit 18 generates a target image having a high dynamic range that is obtained by correcting each regions based on exposure conditions of the respective regions, by using captured image data for each of the regions that have used exposure conditions different from each other in image capturing performed by the image sensor 14. The development processing unit 19 performs development processing for parameters, such as white balance, Debayer, a noise reduction, sharpness, and a gamma correction, on the target image obtained by correction performed on each of the regions. The interface 25 distributes the image subjected to the development processing by the development processing unit 19 as a streamed video image via the network 2.

In a case where the terminal apparatus 3 receives the streamed video image from the network camera 1 via the network 2, the terminal apparatus 3 displays a video image according to the received image. Accordingly, the user can view the streamed video image having the high dynamic range that is captured by the network camera 1.

Determine Exposure Conditions

In the following description, an example of processing for determining exposure conditions for each of the regions on the network camera 1 will be described.

The region-by-region luminance information generation unit 20 receives a target image from the region-by-region correction unit 18 as an input, and generates region-by-region luminance information. More specifically, in a case where a moving image is captured, the region-by-region luminance information generation unit 20 generates region-by-region luminance information from, for example, a target image captured in the present frame (in the present image capturing).

FIG. 2A is a diagram illustrating an example of an already acquired captured image 31 that has been captured in the present image capturing (the image capturing of the present frame) by the image sensor 14 and has been corrected to be a target image by the region-by-region correction unit 18. The already acquired captured image 31 is an image captured under such a backlit condition that a road between buildings extends vertically and the sun is behind the buildings, thus the image has a large luminance difference. The region-by-region luminance information generation unit 20 receives the already acquired captured image 31 as an input, generates region-by-region luminance information 32 illustrated in FIG. 2B, and stores the region-by-region luminance information 32 into the region-by-region luminance information storage unit 21.

The region-by-region luminance information 32 indicates an example in which the already acquired captured image 31 is divided into twelve regions horizontally and eight regions vertically and these regions are classified into three levels according to a luminance value of each of the regions by the region-by-region luminance information generation unit 20. The division into twelve regions horizontally and eight regions vertically is the same as a region division on the image sensor 14. In other words, the network camera 1 is a camera that allows the image sensor 14 to be divided into a total of 96 regions including twelve regions horizontally and eight regions vertically and can capture an image using exposure conditions different from each other in each of the regions. The luminance levels are grouped into three levels by setting two boundary conditions, and are defined to be a dark level to a bright level in the order of legends 35, 36, and 37 as illustrated in FIG. 2C. In the example of this region-by-region luminance information 32, a region 33, where the front side of the building is captured, is classified as the dark level indicated by the legend 35 because the area is shadowed from the sun, and a region 34, where the sun is captured, is classified as the bright level indicated by the legend 37.

Calculate Movement Information

The movement information calculation unit 12 stores therein information, such as a focal length and pan and tilt angles, which are setting information corresponding to image capturing conditions used for the present image capturing. In a case where the movement information calculation unit 12 receives control information including setting information for use in the next image capturing from the CPU 17, the movement information calculation unit 12 calculates information, such as an movement amount and a direction between the already acquired captured image and an image to be captured in the next image capturing, based on the stored setting information used in the present image capturing.

Then, the movement information calculation unit 12 feeds the calculated information to the exposure condition determination unit 11 as movement information. The information calculated by the movement information calculation unit 12 may be not only the movement information but also change information about the image including, for example, a change in luminance of the entire captured image.

The CPU 17 can feed the control information including the setting information for use in the next image capturing to the movement information calculation unit 12 since the CPU 17 controls settings and timings of the pan head control unit 24, the optical system control unit 23, and the sensor control unit 22.

Figure 3:
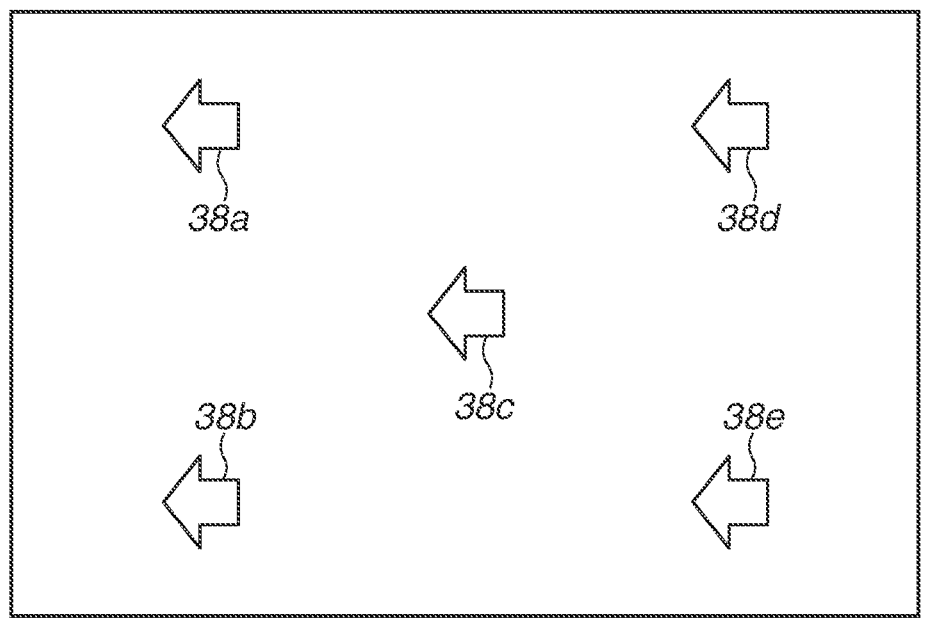
FIG. 3 is a diagram illustrating an example of information about a movement amount and a direction (movement information) under pan control.
Figure 4:
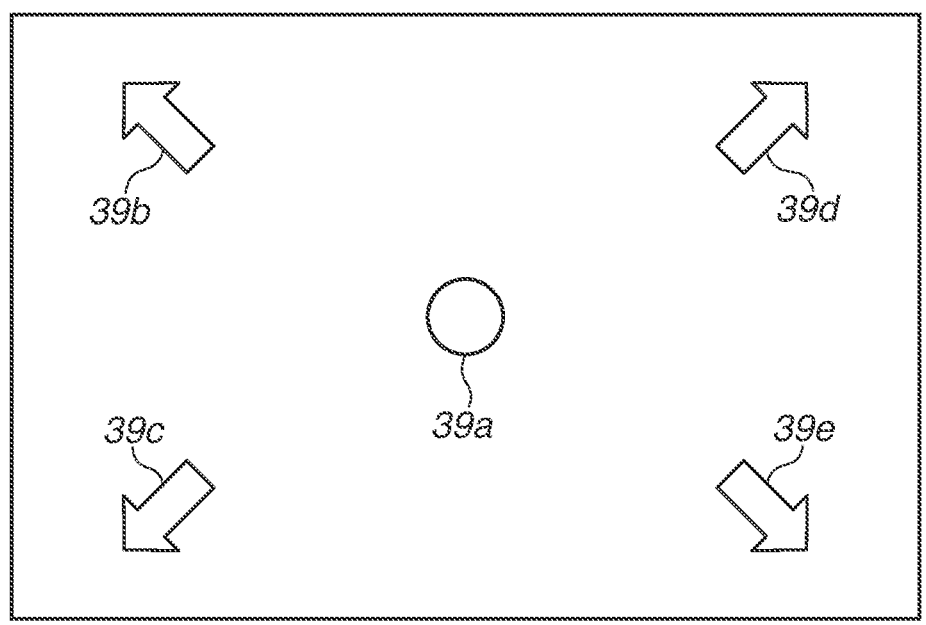
FIG. 4 is a diagram illustrating an example of information about a movement amount and a direction (movement information) under zoom control.

The movement information refers to information indicating an orientation of a movement direction and a movement amount of each of the regions in the image as illustrated in, for example, FIGS. 3 and 4.

FIG. 3 illustrates a state in which the captured image moves leftward as a whole at the time of the next image capturing due to rightward pan control. A direction and a length of each of arrows 38a to 38e indicate a movement direction and a movement amount, respectively.

FIG. 4 illustrates that a central portion 39a is not changed but the periphery is enlarged as indicated by a direction and a length of each of arrows 39b to 39e in the image to be captured in the next image capturing due to zoom-in control.

Figure 5A:
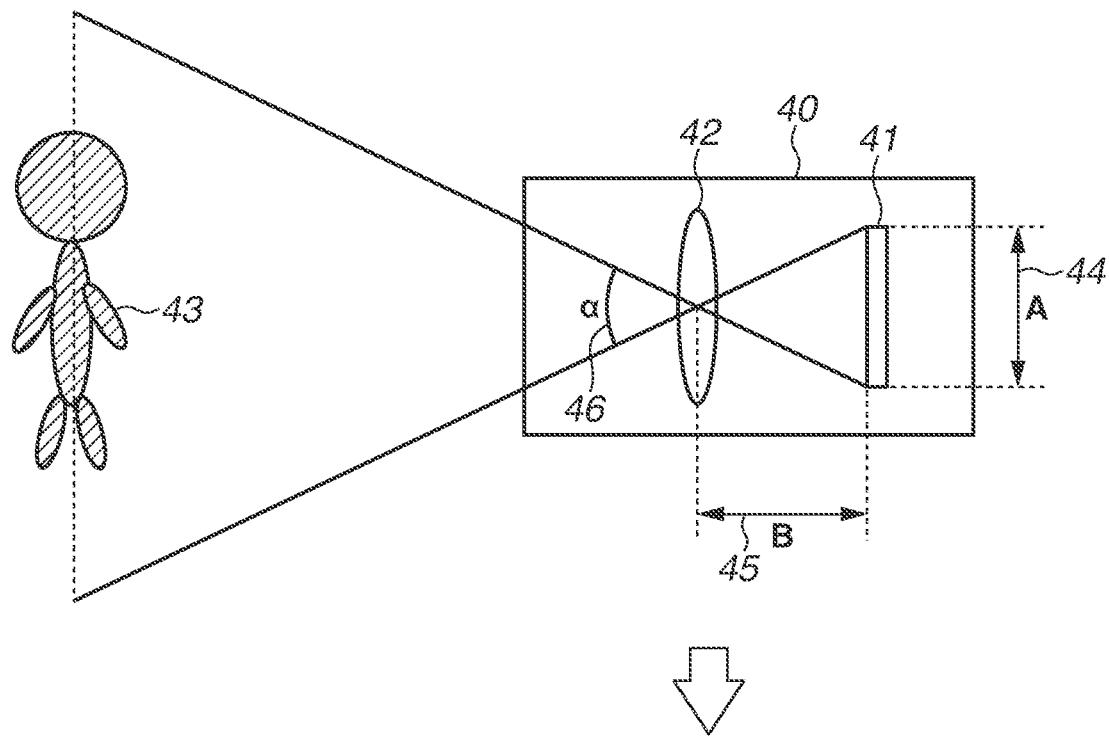
FIGS. 5A and 5B are diagrams each illustrating an example of a method for calculating a movement amount under zoom control.
Figure 5B:
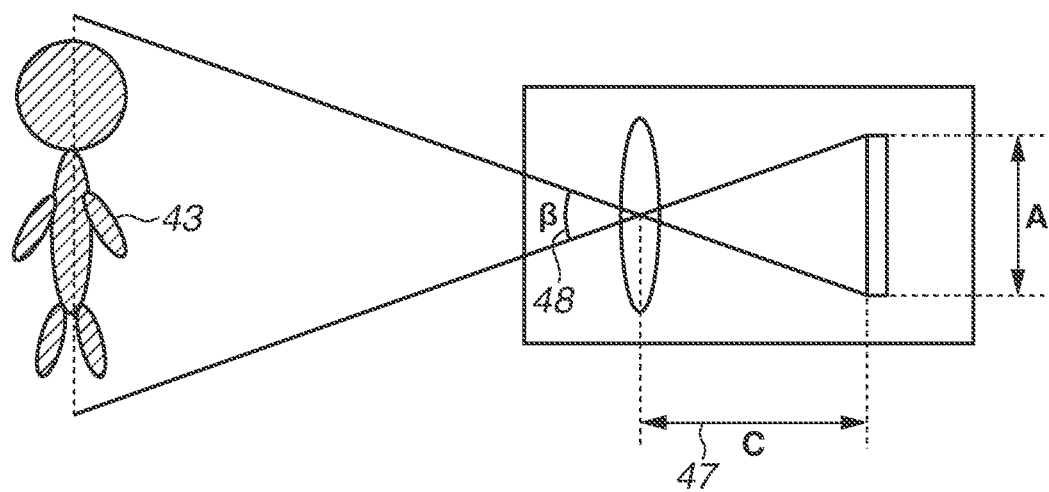

FIGS. 5A and 5B illustrate an example of a method for calculating a movement amount in zoom-in control.

The example illustrated in FIG. 5A includes a network camera 40 corresponding to the network camera 1. The example illustrated in FIG. 5A further includes an image sensor 41 corresponding to the image sensor 14, an optical system 42 corresponding to the optical system 13, and an image capturing target 43.

In FIGS. 5A and 5B, an arrow 44 indicates a size A of the image capturing plane of the image sensor 14, an arrow 45 indicates a focal length B in the present image capturing, and an angle 46 indicates an angle of view α in the present image capturing. A description will be given of a case where the focal length B indicated by the arrow 45 and the angle of view α indicated by the angle 46 are changed to a focal length C indicated by an arrow 47 and an angle of view β indicated by an angle 48 in FIG. 5B, respectively, in the next image capturing due to a movement of the optical system 13 under zoom-in control by the CPU 17. The size A indicated by the arrow 44 of the image capturing plane of the image sensor 14 is kept the same.

The angle of view α indicated by the angle 46 in the present image capturing and the angle of view β indicated by the angle 48 in the next image capturing can be calculated by the following equations (1), respectively.

$$\alpha = \frac{180}{\pi} * 2\tan^{-1}(A/2B) \qquad (1)$$

$$\beta = \frac{180}{\pi} * 2\tan^{-1}(A/2C)$$

A movement amount can be calculated using the following equation (2) using a ratio between the angle of view β indicated by the angle 48 and the angle of view α indicated by the angle 46, multiplied by the size A indicated by the arrow 44 of the image capturing plane.

$$\frac{\beta}{\alpha}A \qquad (2)$$

Figure 6A:
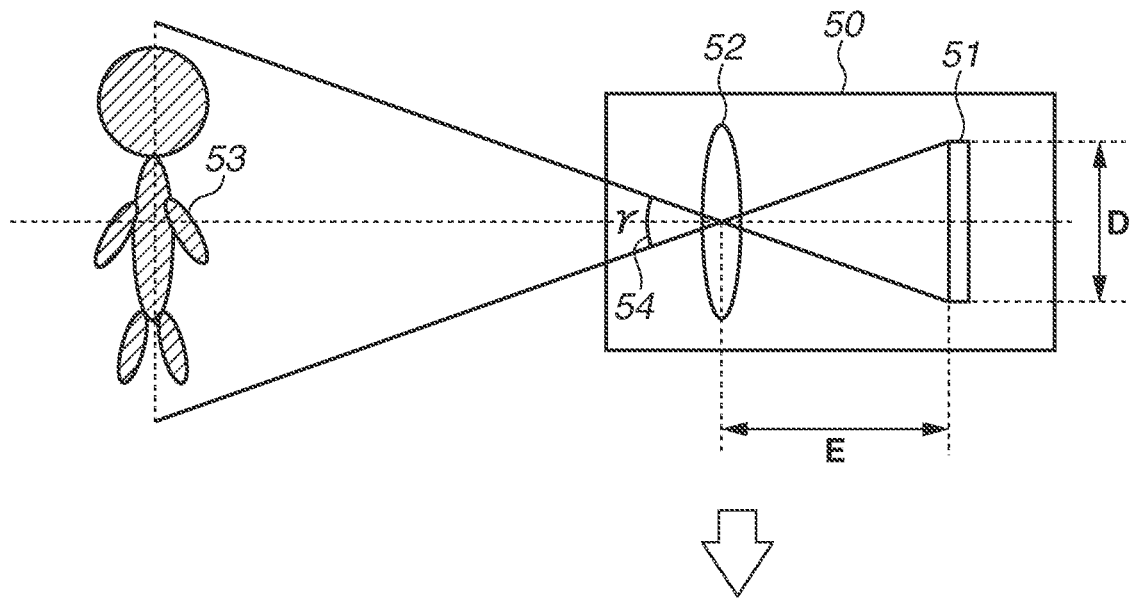
FIGS. 6A and 6B are diagrams each illustrating an example of a method for calculating a movement amount under pan control.
Figure 6B:
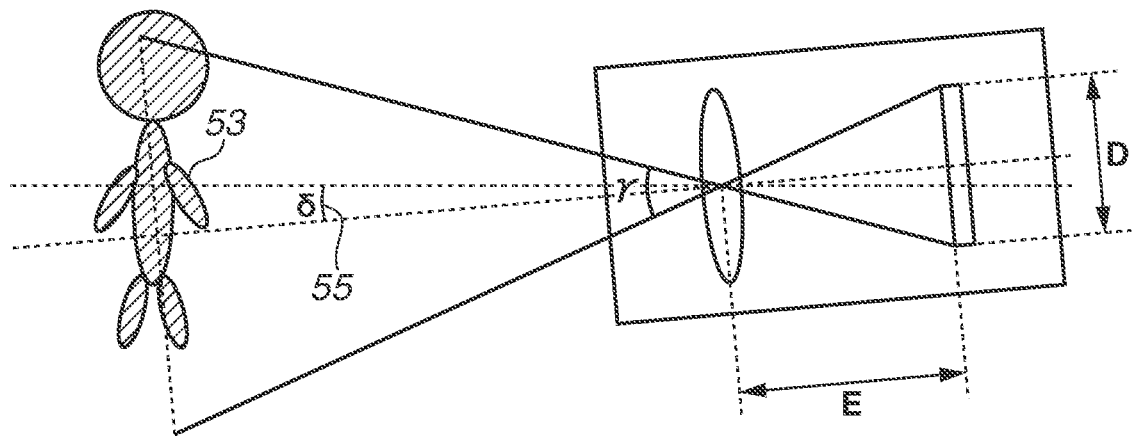

FIGS. 6A and 6B illustrate an example of a method for calculating a movement amount in pan control (viewed from above in the vertical direction).

A movement amount in tilt control can also be calculated by a similar calculation method.

The example illustrated in FIG. 6A includes a network camera 50 corresponding to the network camera 1. The example illustrated in FIG. 6A further includes an image sensor 51 corresponding to the image sensor 14, an optical system 52 corresponding to the optical system 13, and the image capturing target 53. A size D of the image capturing plane of the image sensor 14 is kept the same. Since pan control is performed, a focal length E and an angle of view γ indicated by an angle 54 are also kept the same. An angle δ indicated by an angle 55 of the network camera 50 illustrated in FIG. 6B is changed between when the present image capturing is performed and when the next image capturing is performed.

The angle of view γ indicated by the angle 54 can be calculated by the following equation (3).

$$\gamma = \frac{180}{\pi} * 2\tan^{-1}(D/2E) \qquad (3)$$

The angle δ indicated by the angle 55 can be calculated by the following equation (4), for example, in a case where pan control is performed by 20 degrees at an interval of 3 seconds with an image capturing setting of 30 frames per second (fps).

$$\delta = \frac{20}{30 \times 3} \qquad (4)$$

A movement amount can be calculated by the following equation (5) using the angle of view γ indicated by the angle 54, the angle δ indicated by the angle 55 indicating an angle difference between when the present image capturing is performed and when the next image capturing is performed, and the size D of the image capturing plane.

$$\frac{\delta}{\gamma}D \qquad (5)$$

Details of Determination of Exposure Conditions

This network camera 1 is configured to predict an image of a frame to be imaged next (a next image) based on a captured image in the present frame (a present image) and determine appropriate exposure conditions for each of the regions on the image sensor 14 based on the predicted image.

The exposure condition determination unit 11 acquires the movement information indicating a movement amount and a direction between the already acquired captured image and the image to be captured in the next image capturing from the movement information calculation unit 12, and acquires the region-by-region luminance information about the already acquired captured image from the region-by-region luminance information storage unit 21. Further, the exposure condition determination unit 11 determines exposure conditions for use in the next image capturing based on the acquired movement information and the acquired region-by-region luminance information, and feeds the determined exposure conditions to the sensor control unit 22.

Figure 2B:
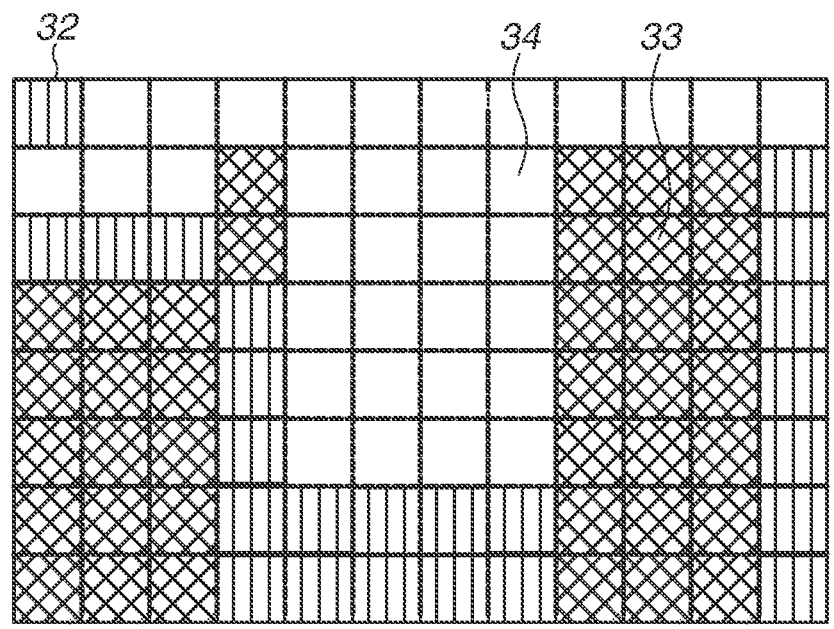
FIGS. 2B and 2C are diagrams each illustrating an example of region-by-region luminance information.
Figure 2C:
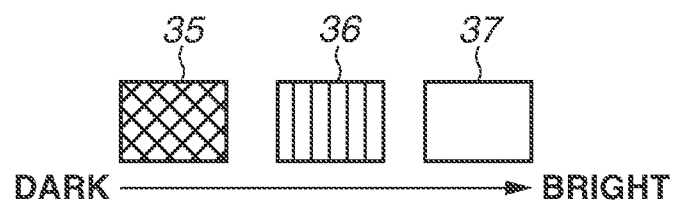

In the case of image capturing under the above-described pan control, the exposure condition determination unit 11 acquires the movement information illustrated in FIG. 3 and the region-by-region luminance information 32 illustrated in FIG. 2B and performs shifting on the region-by-region luminance information 32 based on the movement information, whereby the exposure condition determination unit 11 generates region-by-region luminance information about the next image capturing.

Figure 7A:
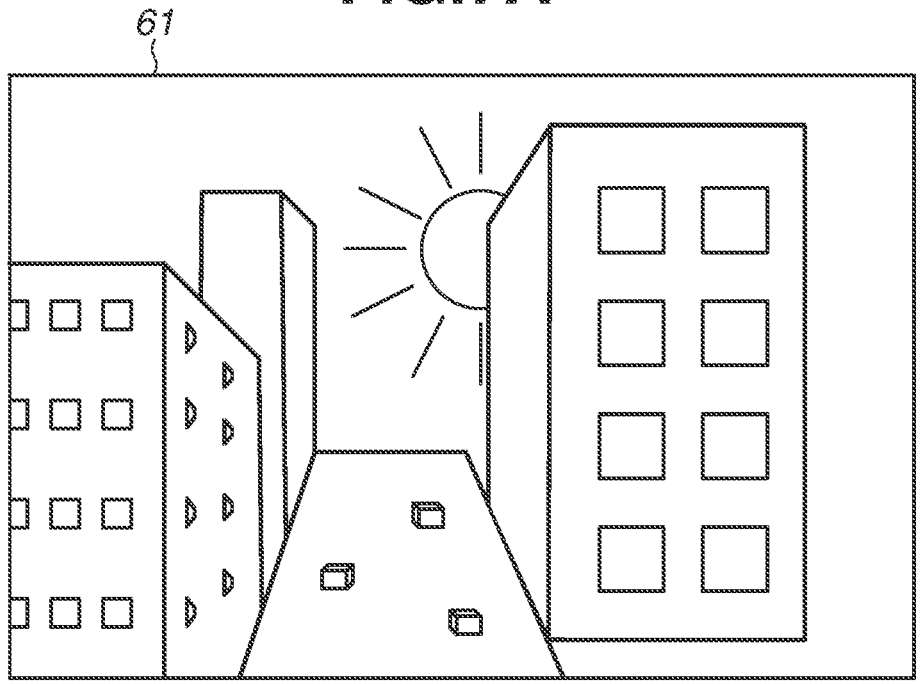
FIG. 7A is a diagram illustrating a predicted image that is to be acquired in next image capturing under pan control.
Figure 7B:
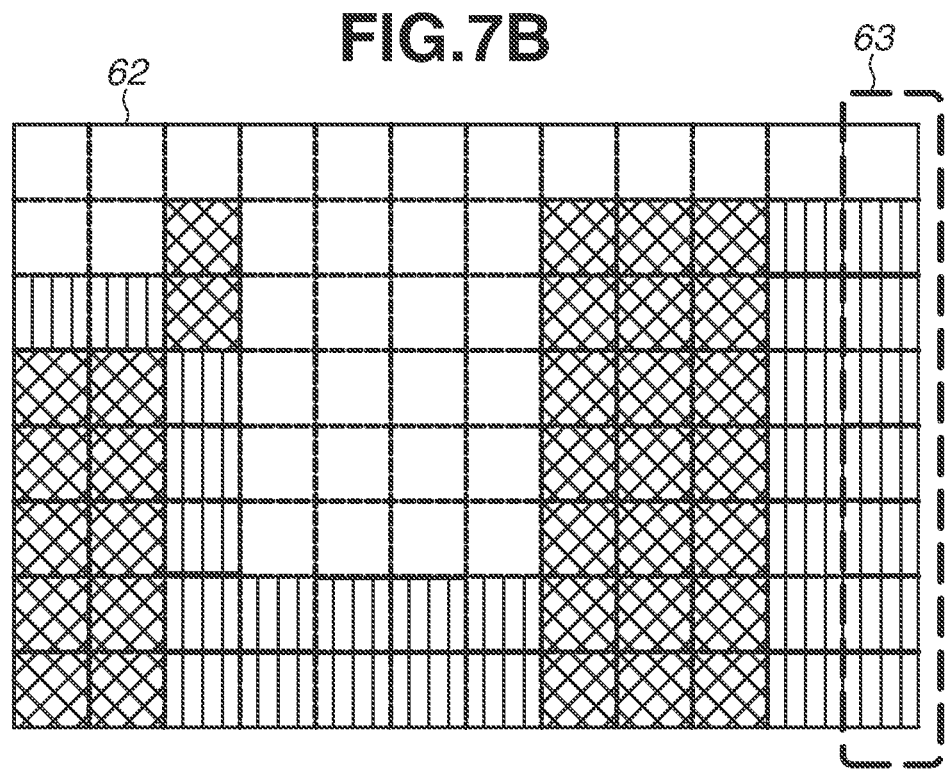
FIG. 7B is a diagram illustrating an example of region-by-region luminance information to be applied to the next image capturing under pan control.

FIGS. 7A and 7B illustrate an example of the luminance information for each of the regions that is to be applied in the next image capturing in pan control. FIG. 7A will be described below.

An example illustrated in FIG. 7B is a shifted region-by-region luminance information 62 about the next image capturing.

The shifted region-by-region luminance information 62 corresponds to region-by-region luminance information generated by shifting the region-by-region luminance information 32 in FIG. 2B leftward as a whole according to the movement information in FIG. 3. Since the shifted region-by-region luminance information 62 about the next image capturing is not necessarily perfectly fitted to the regions defined by dividing the image into twelve regions horizontally and eight regions vertically depending on the movement amount, region-by-region luminance information divided into twelve regions horizontally and eight regions vertically is calculated using averaging or the like. A right edge portion 63 in the shifted region-by-region luminance information 62 is a region not included in the already acquired captured image 31 in FIG. 2A, and thus luminance information about the region may be absent in the region-by-region luminance information 32 shifted leftward. In such a case, the luminance information about the next image capturing is generated by compensating for the absent luminance information by a method of, for example, copying luminance information in an adjacent region.

After that, the exposure condition determination unit 11 determines exposure conditions for each of the regions for use in the next image capturing by determining exposure conditions (for example, an exposure value (EV value)) for each of the regions based on a table 70 for use in determination of the exposure conditions, which is set as illustrated in, for example, FIG. 8, and the shifted region-by-region luminance information 62.

The sensor control unit 22 in FIG. 1 performs image capturing in the next frame by controlling the image sensor 14 according to the exposure conditions for each of the regions acquired from the exposure condition determination unit 11, and the timings fed from the CPU 17.

An example illustrated in FIG. 7A is a predicted image 61 that is to be acquired in the next image capturing. The exposure condition determination unit 11 determines the exposure conditions based on the shifted region-by-region luminance information 62 about the next image capturing obtained by calculation, whereby an image can be captured with a reduced risk of overexposure or underexposure even in a case where a displacement occurs between an image in the present image capturing and an image in the next image capturing.

In the case of image capturing under the above-described zoom-in control, similarly, the exposure condition determination unit 11 acquires the movement information illustrated in FIG. 4 and the region-by-region luminance information 32 illustrated in FIG. 3 and performs the shifting on the region-by-region luminance information 32 based on the movement information, whereby the exposure condition determination unit 11 generates the region-by-region luminance information about the next image capturing.

Figure 9A:
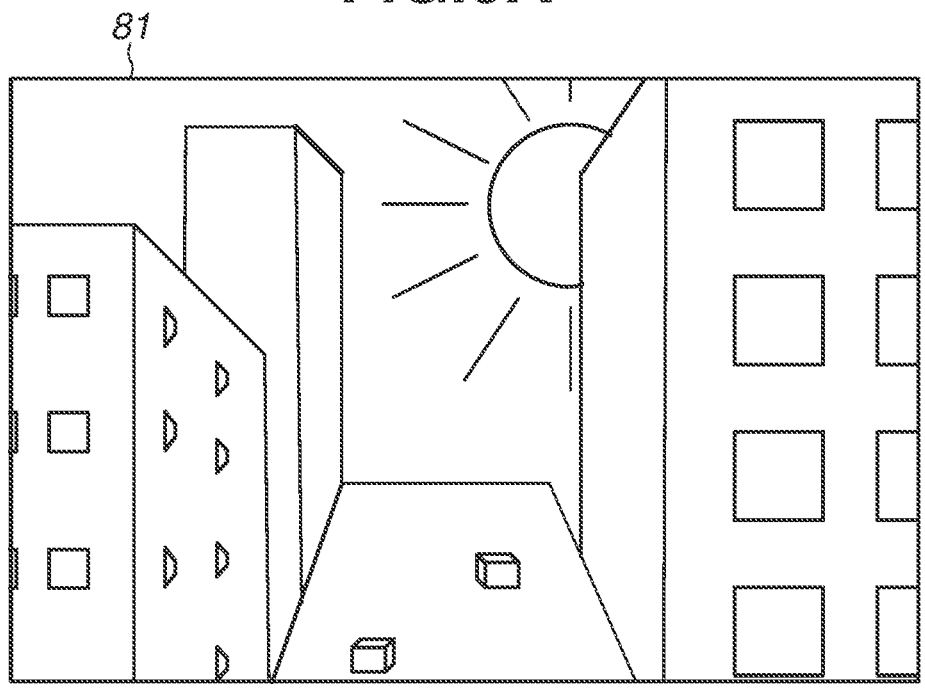
FIG. 9A is a diagram illustrating a predicted image that is to be acquired in next image capturing under zoom control.
Figure 9B:
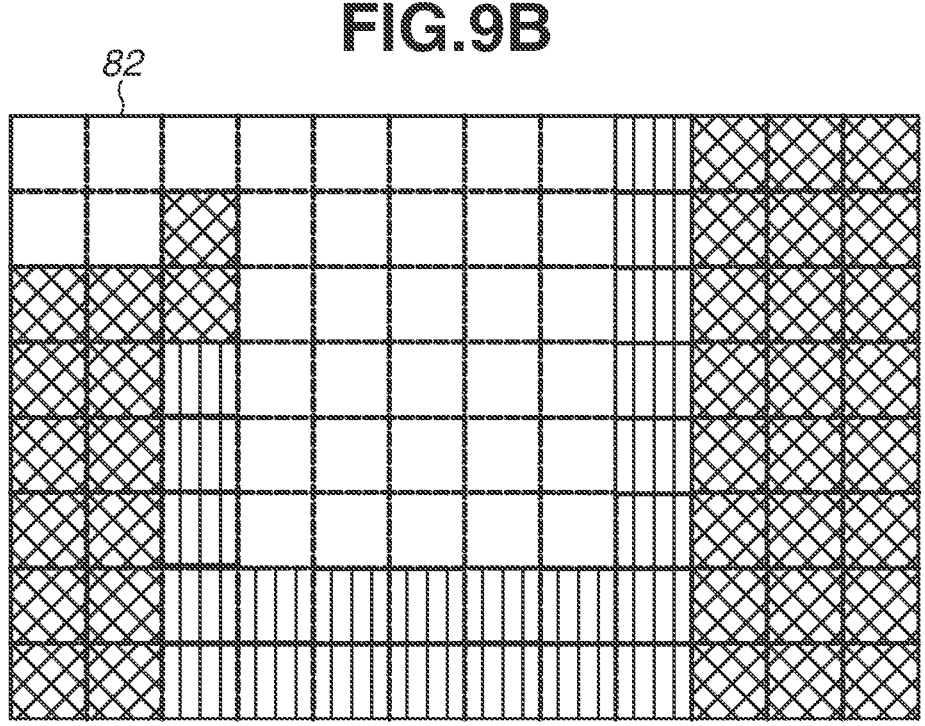
FIG. 9B is a diagram illustrating an example of region-by-region luminance information to be applied to the next image capturing under zoom control.

An example illustrated in FIG. 9B is a shifted region-by-region luminance information 82 about the next image capturing.

The shifted region-by-region luminance information 82 corresponds to region-by-region luminance information generated by enlarging the region-by-region luminance information 32 in FIG. 2B as a whole according to the movement information in FIG. 4. After that, the exposure condition determination unit 11 determines exposure conditions for each of the regions for use in the next image capturing by determining exposure conditions (for example, the EV value) for each of the regions based on the table 70 for use in determination of exposure conditions illustrated in FIG. 8 and the shifted region-by-region luminance information 82.

An example illustrated in FIG. 9A is a predicted image 81 that is to be acquired in the next image capturing. Similarly to the case of image capturing under the above-described pan control, the exposure condition determination unit 11 determines the exposure conditions for each of the regions based on the shifted region-by-region luminance information 82 about the next image capturing obtained by calculation, whereby an image without overexposure and underexposure can be captured even in a case where a displacement occurs between an image in the present image capturing and an image in the next image capturing.

Exposure Condition Processing Flow

Figure 10:
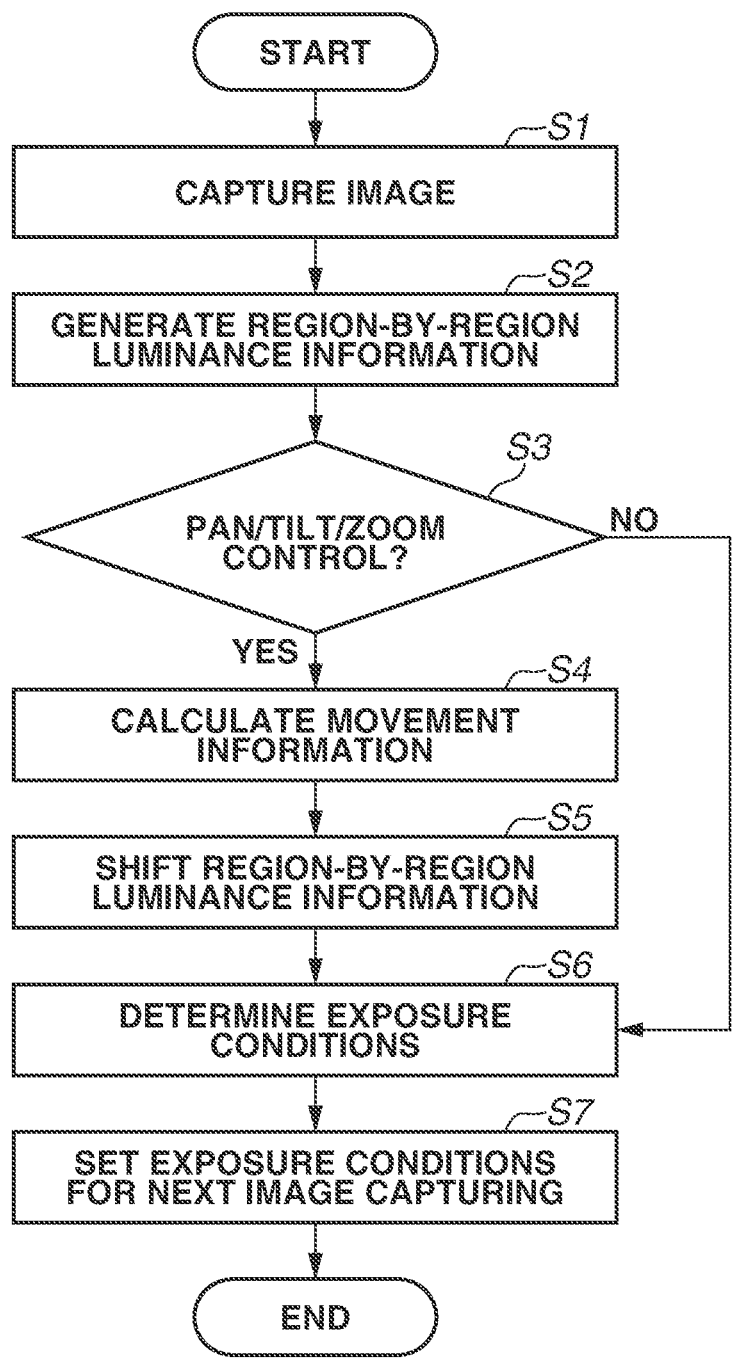
FIG. 10 is a flowchart illustrating an example of processing for determining exposure conditions based on shifting performed on luminance information.

FIG. 10 is a flowchart illustrating the processing for determining exposure conditions for use in the next image capturing.

First, in step S1, the network camera 1 captures an image.

In step S2, the region-by-region luminance information generation unit 20 generates region-by-region luminance information.

In step S3, the CPU 17 determines whether pan/tilt/zoom control is to be performed in the next image capturing. In a case where pan/tilt/zoom control is to be performed (YES in step S3), the CPU 17 feeds the control information to the movement information calculation unit 12. In a case where pan/tilt/zoom control is not to be performed (NO in step S3), the processing proceeds to step S6.

In step S4, the movement information calculation unit 12 calculates movement information that is information about a movement amount and a direction between the already acquired captured image and an image to be captured in the next image capturing, based on the control information acquired from the CPU 17 and stored setting information used in the present image capturing, and feeds the calculated information to the exposure condition determination unit 11.

In step S5, the exposure condition determination unit 11 acquires the movement information from the movement information calculation unit 12 and region-by-region luminance information about the already acquired captured image fed from the region-by-region luminance information storage unit 21, and shifts the region-by-region luminance information, to calculate region-by-region luminance information about the next image capturing.

In step S6, the exposure condition determination unit 11 determines exposure conditions for each of the regions for use in the next image capturing based on the calculated region-by-region luminance information about the next image capturing and the table 70 for determining exposure conditions illustrated in FIG. 8. In a case where the CPU 17 determines that pan/tilt/zoom control is not to be performed in step S3 (NO in step S3), the exposure condition determination unit 11 sets region-by-region luminance information about the already acquired captured image acquired from the region-by-region luminance information storage unit 21 as the region-by-region luminance information about the next image capturing, and determines exposure conditions for each of the regions for use in the next image capturing.

In step S7, the exposure condition determination unit 11 sets the determined exposure conditions to the sensor control unit 22, and the next image capturing is performed.

With the above-described manner, in the present embodiment, luminance information about the present image capturing is shifted based on movement information and exposure conditions for use in the next image capturing is determined, whereby an image without overexposure and underexposure can be captured even in a case where a displacement occurs between an image in the present image capturing and an image in the next image capturing. In other words, according to the present embodiment, exposure conditions can be appropriately controlled for each of the regions on the image sensor even in a case where image capturing conditions, such as panning, tilting, and zooming, are changed. According to the present embodiment, since exposure conditions for use in the next image capturing are determined based on region-by-region luminance information about the present image capturing, a delay for determining exposure conditions can be reduced compared to a case where exposure conditions are determined by preliminary image capturing.

In the first embodiment, exposure conditions are determined based on luminance information shifted based on movement information. In a second embodiment, exposure conditions for use in the next image capturing are determined by shifting in which exposure conditions for each of the regions that are determined using region-by-region luminance information obtained before shifting is shifted based on movement information.

An image capturing system according to the present embodiment is configured in a similar manner to the image capturing system according to the first embodiment.

In the following description, processing in which the network camera 1 according to the present embodiment determines exposure conditions for use in the next image capturing will be described with reference to a flowchart of FIG. 11.

First, in step S21, the network camera 1 captures an image.

In step S22, the region-by-region luminance information generation unit 20 generates region-by-region luminance information.

In step S23, the exposure condition determination unit 11 acquires the region-by-region luminance information about the already acquired captured image from the region-by-region luminance information storage unit 21, and determines exposure conditions for each of the regions based on the above-described table 70 for use in determination of the exposure conditions illustrated in FIG. 8.

In step S24, the CPU 17 determines whether pan/tilt/zoom control is to be performed at the time of the next image capturing. In a case where pan/tilt/zoom control is to be performed (YES in step S24), the CPU 17 transmits the control information to the movement information calculation unit 12. In a case where pan/tilt/zoom control is not to be performed (NO in step S24), the processing proceeds to step S27.

In step S25, the movement information calculation unit 12 calculates movement information that is information about a movement amount and a direction between the already acquired captured image and an image to be acquired in the next image capturing, based on the control information acquired from the CPU 17 and stored setting information used in the present image capturing, and feeds the movement information to the exposure condition determination unit 11.

In step S26, the exposure condition determination unit 11 determines exposure conditions for use in the next image capturing by shifting the exposure conditions for each of the regions determined in step S23 based on the movement information acquired from the movement information calculation unit 12. As for a region in which exposure conditions are absent, the exposure condition determination unit 11 compensates for the exposure conditions of the region in the absence of exposure conditions by using an exposure condition of a region near the region, in the shifting of the exposure conditions.

In step S27, the exposure condition determination unit 11 sets the determined exposure conditions to the sensor control unit 22, and the next image capturing is performed. In a case where pan/tilt/zoom control is not to be performed in step S24 (NO in step S24), the exposure condition determination unit 11 sets the exposure conditions calculated (determined) in step S23 as exposure conditions for use in the next image capturing, and the next image capturing is performed.

In the above-described manner, according to the present embodiment, exposure conditions for each of the regions can be determined in consideration of displacement in an image to be obtained in the main image capturing, based on control information set to the image capturing system and luminance information about each of the regions in the present image capturing. Therefore, an image without overexposure and underexposure can be captured even in a case where a displacement occurs between an image in the present image capturing and an image in the next image. In other words, according to the present embodiment, exposure conditions can be appropriately controlled for each of the regions on the image sensor even in a case where panning, tilting, and zooming is performed.

Modifications

While the representative embodiments of the present disclosure have been described above, the present disclosure is not limited to these embodiments and can be modified and changed in various manners within the scope of the claims. For example, the above-described embodiments have been described using the example case where a moving image is captured, but the present disclosure can also be applied to a case where main image capturing is performed after preliminary image capturing of a still image is performed. Alternatively, each function of the network camera 1 may be implemented while being distributed to a plurality of apparatuses. The present disclosure can be embodied as, for example, a system, an apparatus, a method, a program, or a recording medium (a storage medium).

The present disclosure can also be realized by processing that supplies a program capable of fulfilling one or more functions of the above-described embodiments to a system or an apparatus via a network or a storage medium, and causes one or more processors in a computer of this system or apparatus to read out and execute the program. The present disclosure can also be realized by a circuit (for example, an application specific integrated circuit (ASIC)) capable of fulfilling one or more functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2020-206642, filed Dec. 14, 2020, which is hereby incorporated by reference herein in its entirety.

What is claimed is:

1. An image capturing apparatus comprising:
at least one processor; and
a memory that stores a program which, when executed by the at least one processor, causes the at least one processor to function as:
an image capturing unit configured to capture an image with a first exposure condition being set for each of regions on the image;
an acquisition unit configured to acquire first luminance information about each of the regions in the image captured by the image capturing unit;
a calculation unit configured to calculate change information about an image to be acquired in next image capturing; and
a determination unit configured to determine a second exposure condition for each of the regions in the next image capturing,
wherein the determination unit calculates second luminance information by shifting the first luminance information about each of the regions acquired by the acquisition unit, based on the change information acquired from the calculation unit, and
wherein the second exposure condition is determined based on the second luminance information resulting from the calculation.

2. The image capturing apparatus according to claim 1, wherein the calculation unit calculates information about a movement amount and a direction of the image to be acquired in the next image capturing.

3. The image capturing apparatus according to claim 1, wherein the calculation unit calculates the change information about the image to be acquired in the next image capturing based on an image capturing condition for the image capturing unit.

4. The image capturing apparatus according to claim 3, wherein the calculation unit calculates the change information based on information about at least any one of panning, tilting, and zooming of the image capturing unit.

5. The image capturing apparatus according to claim 1, wherein the determination unit compensates for luminance information of a region not having the luminance information as a result of the shifting based on luminance information of a region near the region not having the luminance information, and determines the second exposure condition based on the compensated luminance information.

6. A method for controlling an image capturing apparatus comprising:
capturing an image with a first exposure condition being set for each of regions on the image;
acquiring first luminance information about each of the regions in the image captured by the capturing;
calculating change information about an image to be acquired in next image capturing; and
determining a second exposure condition for each of the regions in the next image capturing,
wherein the determining calculates second luminance information by shifting the first luminance information about each of the regions acquired by the acquiring, based on the change information acquired from the calculating, and
wherein the second exposure condition is determined based on the second luminance information resulting from the calculation.

7. The method for controlling the image capturing apparatus according to claim 6, comprising calculating information about a movement amount and a direction of the image to be acquired in the next image capturing.

8. The method for controlling the image capturing apparatus according to claim 6, comprising calculating the change information about the image to be acquired in the next image capturing based on an image capturing condition for the capturing the image.

9. The method for controlling the image capturing apparatus according to claim 6, comprising calculating the change information based on information about at least one of panning, tilting, and zooming.

10. The method for controlling the image capturing apparatus according to claim 6, comprising:
compensating for luminance information of a region not having the luminance information as a result of the shifting based on luminance information of a region near the region not having the luminance information; and
determining the second exposure condition based on the compensated luminance information.

11. A non-transitory computer-readable medium storing a program for causing a computer to execute a method comprising:
capturing an image with a first exposure condition being set for each of regions on the image;
acquiring first luminance information about each of the regions in the image captured by the capturing;
calculating change information about an image to be acquired in next image capturing; and
determining a second exposure condition for each of the regions in the next image capturing,
wherein the determining calculates second luminance information by shifting the first luminance information about each of the regions acquired by the acquiring, based on the change information acquired from the calculating, and
wherein the second exposure condition is determined based on the second luminance information resulting from the calculation.

12. An image capturing apparatus comprising:
at least one processor; and
a memory that stores a program which, when executed by the at least one processor, causes the at least one processor to function as:
an image capturing unit configured to capture an image with a first exposure condition being set for each of regions on the image;
an acquisition unit configured to acquire first luminance information about each of the regions in the image captured by the image capturing unit;
a calculation unit configured to calculate change information about an image to be acquired in next image capturing; and
a determination unit configured to determine a second exposure condition for each of the regions the next image capturing, based on the change information and the first luminance information,
wherein the determination unit calculates a third exposure condition based on the first luminance information,
wherein the second exposure condition is determined by shifting the third exposure condition for each of the regions based on the change information,
wherein an exposure condition of a region not having the second exposure condition as a result of the shifting is compensated by an exposure condition of a region near the region not having the second exposure condition.

* * * * *